United States Patent [19]

Canevari

[11] Patent Number: 4,560,482
[45] Date of Patent: Dec. 24, 1985

[54] CHEMICAL DISPERSANT FOR VISCOUS OILS

[75] Inventor: Gerard P. Canevari, Cranford, N.J.

[73] Assignee: Exxon Research and Engineering Co., Florham Park, N.J.

[21] Appl. No.: 559,458

[22] Filed: Dec. 8, 1983

[51] Int. Cl.⁴ .............................................. C02B 9/02
[52] U.S. Cl. .................................. 210/749; 210/925; 524/311; 524/474; 524/571; 524/577; 524/588; 524/917
[58] Field of Search ............... 210/749, 925, 696, 698; 524/917, 311, 474, 571, 577, 588

[56] References Cited

U.S. PATENT DOCUMENTS

| | | | |
|---|---|---|---|
| 3,577,340 | 5/1971 | Paviak et al. | 210/42 |
| 3,959,134 | 5/1976 | Canevari | 210/749 |
| 3,977,969 | 8/1976 | Zall | 210/40 |
| 3,996,134 | 12/1976 | Osborn et al. | 210/925 |
| 4,190,531 | 2/1980 | Falk | 210/62 |
| 4,212,759 | 7/1980 | Young et al. | 252/119 |
| 4,388,229 | 6/1983 | Fu | 252/179.23 |

Primary Examiner—Lorenzo B. Hayes
Attorney, Agent, or Firm—Joseph J. Dvorak

[57] ABSTRACT

The present invention consists of treating the surface of a viscous semi-solid oil or water-in-viscous oil emulsion with a chemical dispersant composition that has a viscosity which is sufficiently high that the dispersant will remain in contact with the oil for a time sufficient to disperse it in the water. Thus, in one embodiment of the present invention a chemical dispersant composition for dispersing viscous, almost semi-solid oils in water comprises a dispersing agent and an oil soluble polymer in a ratio whereby said composition has a viscous, sticky, gel-like consistency.

5 Claims, 8 Drawing Figures

TYPICAL CHEMICAL DISPERSION

ROLL-OFF EFFECT OF CONVENTIONAL FLUID DISPERSANT

THICKENED DISPERSANT ADHERES TO VISCOUS OIL

CHEMICAL DISPERSANT FOR VISCOUS OILS

FIELD OF THE INVENTION

The present invention relates to chemical dispersants useful in dispersing viscous, almost semi-solid oils in water.

BACKGROUND OF THE INVENTION

The accidental discharge of crude oil and crude oil products in or near coastal waters has been a problem of considerable concern in view of the threat that such material poses for sea and bird life in the area of the spill. Consequently, a number of techniques have been developed for the containment and cleanup for such accidental discharges. These techniques have their own peculiar limitations and are not universally applicable. For example, one technique for handling an oil spill is to apply to the oil a dispersant so as to disperse the oil within the body of water, such as the ocean. Historically, chemical dispersants have been ineffective in dispersing viscous or semi-solids such as Bunker C, particularly at low temperatures, for example 3° C. Similarly chemical dispersants have been ineffective in dispersing emulsions of such viscous oils-in-water. Apparently, highly viscous oils and water-in-oil emulsions resist the necessary penetration and mixing of the chemical dispersant within the oil or within the emulsion. In fact, the typical dispersants employed have a viscosity sufficiently low that the dispersant tends to flow off the viscous oil before it has had time to diffuse to the interface and perform its role as a dispersant.

SUMMARY OF THE INVENTION

Accordingly, the present invention consists of treating the surface of a viscous semi-solid oil or water-in-viscous oil emulsion with a chemical dispersant composition that has a viscosity which is sufficiently high that the dispersant will remain in contact with the oil for a time sufficient to disperse it in the water. Thus, in one embodiment of the present invention a chemical dispersant composition for dispersing viscous, almost semi-solid oils in water comprises a dispersing agent and an oil soluble polymer in a ratio whereby said composition has a viscous, sticky, gel-like consistency.

DETAILED DESCRIPTION OF THE INVENTION

Figure 1A:
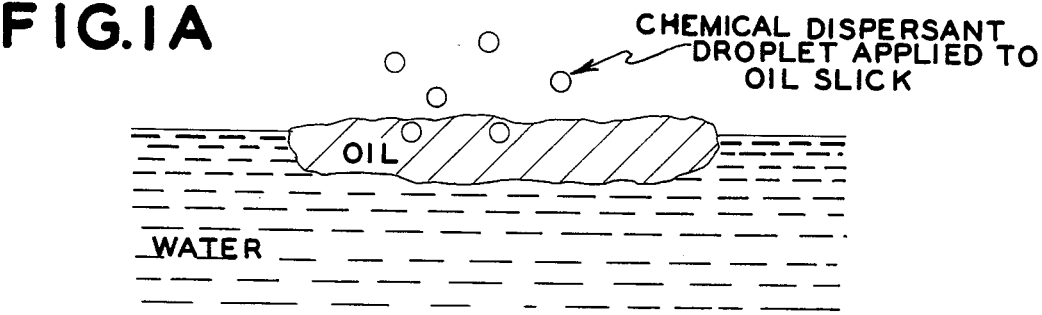
FIGS. 1A, B and C schematically depict the operation of a typical chemical dispersion of an oil slick.
Figure 1B:
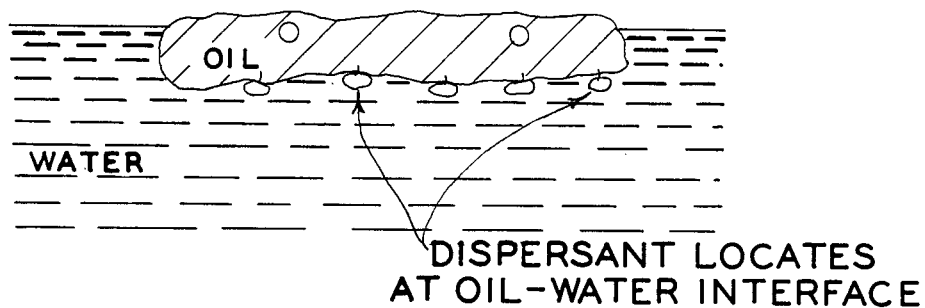
Figure 1C:
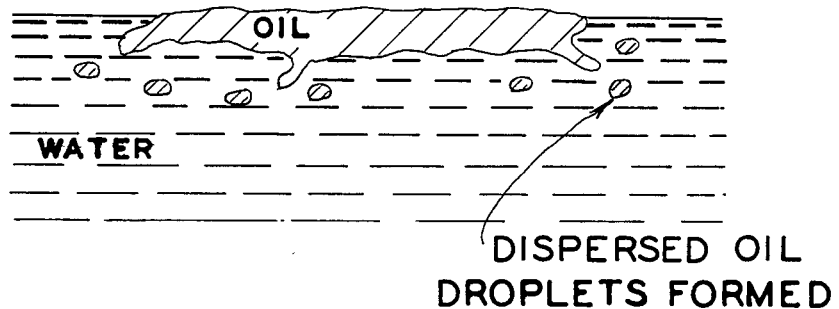

As is schematically depicted in FIG. 1A, upon contact of an oil by a fluid chemical dispersant, the dispersant first penetrates the oil. Thereafter, the dispersant moves through the oil slick to the oil-water interface (FIG. 1B). Finally, dispersion occurs after the chemical dispersant locates at the oil-water interface. Dispersion is shown in FIG. 1C.

Figure 2A:
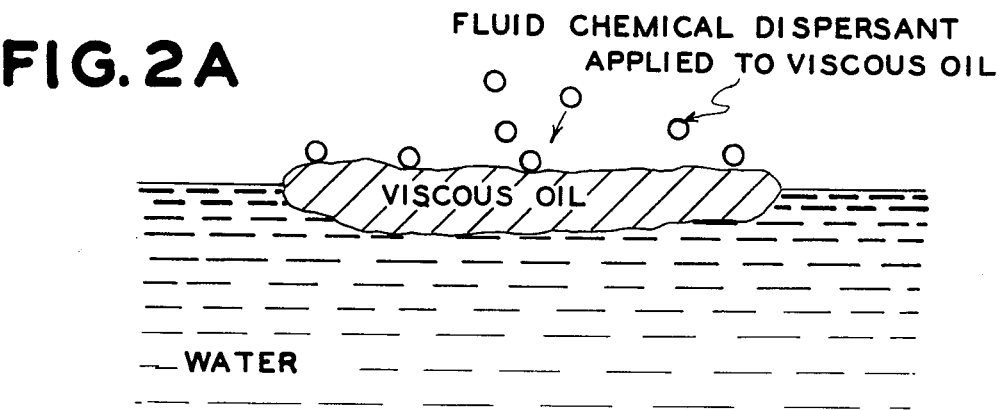
FIGS. 2A and B schematically depict the operation of the typical fluid dispersant on a viscous nearly semi-solid oil slick and illustrate the roll-off effect.
Figure 2B:
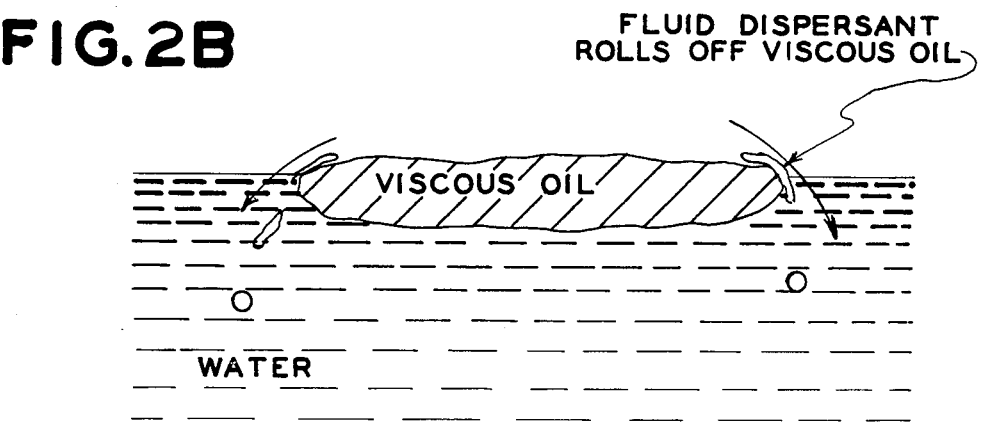

As is well known, the effectiveness of a chemical dispersant tends to decrease with increasing oil viscosity. For example, when the oil becomes semi-solid, that is when it has a viscosity with greater than about 1,000 centipoise and in general in the range of about 1,000 to 10,000 centipoise, the fluid chemical dispersant tends to fail to combine with the oil. This is shown in FIGS. 2A and 2B. As the chemical dispersant is applied to the viscous oil (FIG. 2A), the fluid tends to roll-off the viscous oil (FIG. 2B).

Figure 3:
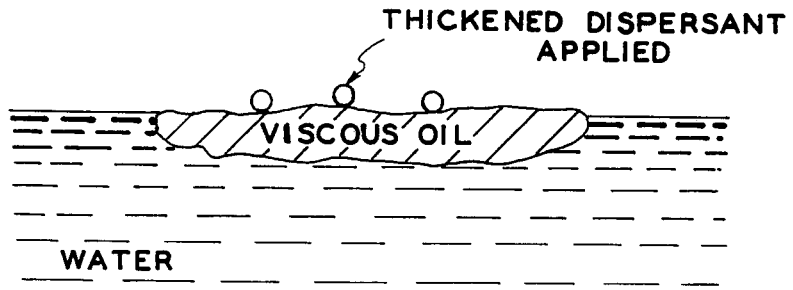
FIGS. 3A, B and C schematically depict the operation of a dispersant composition of the present invention on a viscous nearly semi-solid oil slick.
Figure 3:
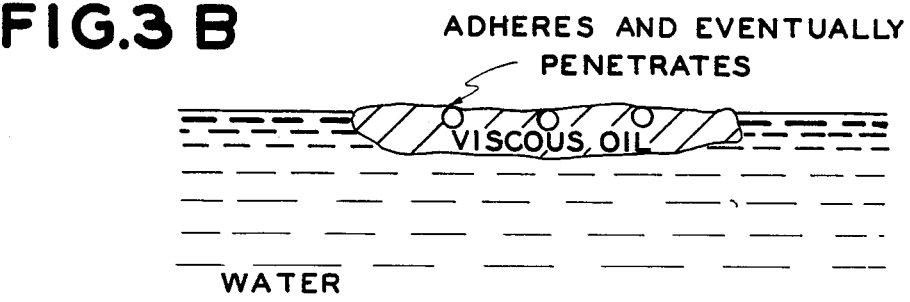
Figure 3C:
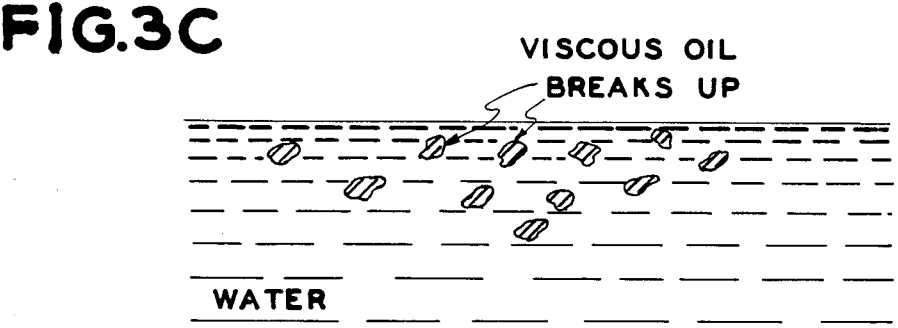

In accordance with the practice of the present invention, novel chemical dispersant compositions are provided for use in dispersing viscous nearly semi-solid oils in water. These compositions contain a dispersing agent and an oil soluble polymer in a ratio whereby the composition has a stickly gel-like consistency. Thus, as is shown in FIG. 3A, when such a thickened dispersant composition is applied to a viscous nearly semi-solid oil slick, the dispersant adheres to the oil (FIG. 3B), penetrates the oil and ultimately finds its way to the oil-water interface and with the result that dispersion occurs (FIG. 3C).

As indicated previously, the chemical dispersant composition of the present invention includes a dispersing agent. The dispersing agent may be selected from a wide range of nonionic surfactants, although polyoxyethylene sorbitan fatty acid esters and sorbitan fatty acid esters are a particularly preferred class of dispersing agents. Among some particular dispersants within the above-mentioned classes, mention is made of polyoxyethylene sorbitan monooleate, polyoxyethylene sorbitol hexaoleate, polyoxyethylene sorbitan trioleates, polyoxyethylene sorbitan tristearate, sorbitan monooleate, and sorbitan trioleate. An ethoxylated amine salt of dodecyl ortho xylene sulfonic acid is also an effective surfactant component.

The chemical dispersant composition of the present invention also includes an oil soluble polymer. The polymer is selected from polymers which will readily mix with the oil and the dispersing agent and cause the dispersing agent to form, with the polymer, a viscous gel-like sticky liquid that will adhere to the semi-solid viscous oil. Among the oil soluble polymers that are particularly useful in the practice of the present invention are the following: polyisobutylene, ethylene-propylene copolymers, polydimethyl siloxane, polypropylene oxide, cis polyisoprene, cis polybutadiene and polystyrene. It is particularly preferred to use polymers such as ethylene-propylene copolymer and polyisobutylene.

In general, the amount of oil soluble polymer that is employed in conjunction with the dispering agent is an amount sufficient to render the composition viscous, sticky and gel-like. Indeed, it is particularly preferred in the practice of the present invention that the composition have a viscosity which is at least 10% of the viscosity of the viscous oil and generally in the range of about 10 to 50% and preferably 25% of the viscosity of the oil to be treated with the dispersing agent.

The above cited additives which act to thicken the dispersing agent as well as to make sticky optionally are extended and/or enhanced by the addition of viscous "pure" petroleum oils, such as solvent 600 neutral, a paraffinic lube oil base stock sold by Exxon Co. U.S.A., Houston, Tex.

To further illustrate the present invention, reference is made to the following example.

EXAMPLE 1

The formulations detailed in Table 1 were prepared and tested in the following manner. 1 g of Bunker C oil at 50° C. was added to a 16 oz jar of sea water. Two drops of the oil dispersant composition being tested was applied to the oil. A list of the test compositions is given in Table 1. Some sloshing was promoted in the beaker by means of stirring with a spatula. Thereafter, the Bunker C was transferred to a second jar containing 16 oz sea water to simulate dilution. A magnetic stirrer was placed in a jar and the mixture was stirred for 1 minute. The oil was effectively dispersed.

The procedures outlined above was repeated a number of times with dispersing agents which did not contain the oil soluble polymer in accordance with the present invention. In each instance, the oil was not effectively dispersed.

methyl siloxane, polypropylene oxide, cis polyisoprene, cis polybutadiene and polystyrene.

2. The composition of claim 1 wherein said surfactant is selected from polyoxyethylene sorbitan fatty acid esters and sorbitan fatty acid esters.

3. A method of dispersing semi-solid oils having a viscosity of from about 1000 to 10,000 centipoise in water comprising applying a dispersant composition to said oil when said oil is on the surface of a body of water, said dispersant composition having a viscosity which is at least 10% of the viscosity of said oil and consist essentially of a non-ionic surfactant selected from the group consisting of polyoxyethylene sorbitan fatty acid esters and sorbitan fatty acid esters, an oil

TABLE 1

| Trade Name(4) | Compound | Run No. | | | | |
|---|---|---|---|---|---|---|
| | | S-2 Amount, % | S-6(1) Amount, % | S-7 Amount, % | S-8 Amount, % | S-9 Amount, % |
| Tween 80 | Polyoxyethylene Sorbitan Monooleate | 14.3 | 25.0 | 5.0 | 25 | 12.5 |
| Span 80 | Sorbitan Monooleate | | 22.5 | 42.5 | 75 | 37.5 |
| Span 85 | Sorbitan Trioleate | 33.2 | | | | |
| G-1096 | Polyoxyethylene Sorbitol Hexaoleate | 23.2 | 23.2 | 23.2 | | |
| Tween 85 | Polyoxyethylene Sorbitan Trioleate | | 29.3 | 29.3 | | |
| Tween 65(2) | Polyoxyethylene Sorbitan Tristearate | 29.3 | | | | |
| | Ethoxylated Amine Salt of Dodecyl Ortho Xylene Sulfonic Acid | | | | | 50 |
| Solvent 600 Neutral | Paraffinic Lube Oil Solvent | 43 | 43 | 43 | | |
| NA(3) | | | | | 50 | 25 |
| % Isopar M | Isoparaffinic Solvent | | | | | 25 |

Note (1): 10% PIB 900 added to S-6 improves adhesion.
Note (2): Tween 65 is a solid at room temperature. However, in association with the other compounds, it acts as a thickener and stays in solution.
Note (3): A 50:50 mixture of Solvent 600N and Polyisobutylene 900 was used.
Note (4): Tween, Span and G-1096 are trademarks of ICI United States, Inc., Wilmington, Delaware.
Solvent 600 Neutral and Isopar are trademarks of Exxon Company, USA, Houston, Texas.

What is claimed is:

1. A chemical dispersant composition for dispersing oils having viscosities of from about 1000 to 10,000 centipoise in water, said composition consisting essentially of:
a non-ionic surfactant, a polymeric agent and a petroleum oil in a ratio whereby said composition has a sticky gel-like consistency and a viscosity of at least 10% of the viscosity of the oil to be dispersed, said polymeric agent being selected from the group consisting of polyisobutylene, ethylene-propylene copolymers, polydimethyl siloxane, polypropylene oxide, cis polyisoprene, cis polybutadiene and polystyrene.

soluble polymer selected from the group consisting of polyisobutylene, ethylene-propylene copolymers, polydimethyl siloxane, polypropylene oxide, cis polyisoprene, cis polybutadiene and polystyrene and a petroleum oil.

4. The method of claim 3 wherein the viscosity of said dispersant composition is in the range of 10% to 50% of the viscosity of the oil.

5. The method of claim 3 wherein the viscosity is 25% of the viscosity of the oil.

* * * * *